(12) United States Patent
Willberg-Keyriläinen et al.

(10) Patent No.: US 12,252,602 B2
(45) Date of Patent: *Mar. 18, 2025

(54) USE OF MOLAR MASS CONTROLLED CELLULOSE

(71) Applicant: Teknologian tutkimuskeskus VTT Oy, Espoo (FI)

(72) Inventors: Pia Willberg-Keyriläinen, Espoo (FI); Jarmo Ropponen, Espoo (FI); Ali Harlin, Espoo (FI); Riku Talja, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 283 days.

This patent is subject to a terminal disclaimer.

(21) Appl. No.: 17/851,874

(22) Filed: Jun. 28, 2022

(65) Prior Publication Data

US 2022/0325005 A1 Oct. 13, 2022

Related U.S. Application Data

(63) Continuation of application No. 16/484,841, filed as application No. PCT/FI2018/050093 on Feb. 12, 2018, now Pat. No. 11,421,042.

(30) Foreign Application Priority Data

Feb. 10, 2017 (FI) ..................................... 20175114

(51) Int. Cl.
*B29B 13/00* (2006.01)
*B29C 64/314* (2017.01)
(Continued)

(52) U.S. Cl.
CPC ................ *C08L 1/08* (2013.01); *B29B 13/00* (2013.01); *B29C 64/314* (2017.08); *B33Y 40/00* (2014.12);
(Continued)

(58) Field of Classification Search
None
See application file for complete search history.

(56) References Cited

U.S. PATENT DOCUMENTS

2004/0226671 A1 11/2004 Nguyen et al.
2008/0234476 A1* 9/2008 Phan ........................ D01F 9/00
536/123

(Continued)

FOREIGN PATENT DOCUMENTS

CN 103435702 A 12/2013
CN 105176070 A 12/2015
(Continued)

OTHER PUBLICATIONS

Chauvelon et al: Acidic Activation of Cellulose and Us Esterification by long-Chain Fatty Acid. Journal of Applied Polymer Science, 1999. vol. 74, pp. 1933-1940.

(Continued)

*Primary Examiner* — Jacob T Minskey
(74) *Attorney, Agent, or Firm* — Laine IP Oy

(57) ABSTRACT

According to an example aspect of the present invention, there is provided a use of molar mass controlled cellulose in injection molding, extrusion and three dimensional printing applications.

14 Claims, 2 Drawing Sheets

(51) Int. Cl.
*B33Y 40/00* (2020.01)
*B33Y 70/00* (2020.01)
*C08B 3/10* (2006.01)
*C08L 1/08* (2006.01)
*B29K 1/00* (2006.01)

(52) U.S. Cl.
CPC ............ *B33Y 70/00* (2014.12); *C08B 3/10* (2013.01); *B29K 2001/08* (2013.01)

(56) References Cited

U.S. PATENT DOCUMENTS

| | | | |
|---|---|---|---|
| 2017/0140848 A1* | 5/2017 | Abidi | H01B 1/12 |
| 2017/0361527 A1 | 12/2017 | Saarikoski et al. | |
| 2020/0040163 A1 | 2/2020 | Cigada et al. | |
| 2022/0289868 A1* | 9/2022 | Colhoun | C08B 3/06 |

FOREIGN PATENT DOCUMENTS

| | | |
|---|---|---|
| CN | 105199001 A | 12/2015 |
| CN | 105218866 A | 1/2016 |
| CN | 106267370 A | 1/2017 |
| JP | 2005097421 A | 4/2005 |
| JP | 2008144174 A | 6/2008 |
| JP | 2009167253 A | 7/2009 |
| WO | WO9620960 A1 | 7/1996 |
| WO | WO2014031419 A1 | 2/2014 |
| WO | WO2016193542 A1 | 12/2016 |

OTHER PUBLICATIONS

Chauvelon et al: Esterification of cellulose-enriched agricultural by-products and characterization of mechanical properties of cellulosic films. Carbohydrate Polymers, 2000, vol. 42, pp. 385-392.

Crepy et al: Synthesis of Cellulose Fatty Esters as Plastics—Influence of the Degree of Substitution and the Fatty Chain Length on Mechanical Properties. Chem Sus Chem, 2009, vol. 2(2), pp. 165-170.

Deflection Temperature Testing of Plastics. http://www.matweb.com/reference/deflection-temperature.aspx, Retrieved Aug. 8, 2019.

Edgar et al: Advances in cellulose ester performance and application. Prog. Polym. Sci., 2001, vol. 26, pp. 1605-1688.

Klemm et al: Cellulose, Biopolymers, 2002, vol. 6, pp. 275-319.

Sjöholm et al: Aggregation of cellulose in lithium chloride/N,N-dimethylacetamide, Polymers, 2000, vol. 41, pp. 153-161.

Wei et al: Synthesis and prpoerties of fatty acid esters of cellulose. J. Sci. Ind. Res., 2007, vol. 66, pp. 1019-1024.

Willberg-Keyriläinen et al: The effect of side-chain length of cellulose fatty acid esters on their thermal, barrier and mechanical properties. Cellulose, Springer Netherlands, Dec. 24, 2016, vol. 24, No. 2, pp. 505-517.

\* cited by examiner

USE OF MOLAR MASS CONTROLLED CELLULOSE

FIELD

The present invention relates to novel biodegradable thermoplastic materials made from molar mass controlled cellulose and to novel uses thereof. These materials are easily processable by existing film extrusion, injection moulding and three dimensional printing machineries.

BACKGROUND

Cellulose is the most abundant renewable organic polymer on the earth and hence can be regarded as important raw material for several industries such as textiles, papers, foods, cosmetics and biomaterials (Edgar et al., 2001). Cellulose is a linear polymer that consists of $\beta(1\rightarrow4)$ linked D-glucose units. Hydroxyl groups of cellulose forms strong inter and intra molecular hydrogen bonds and van der Waals interactions forming a resistant and stiff microfibril network. This structure is not uniform, and both highly ordered (crystalline) regions and regions with a low degree of order can be found. The relative proportion of these regions depends on the raw material and the treatments to which the cellulose has been produced (Klemm et al., 2002). Moreover, these regions caused the limited solubility of cellulose and make it difficult for solvents and reagents to access areas within the cellulose fibres. As known this network is poorly reactive requiring a large excess of chemicals or demanding process conditions.

The modification of cellulose can be done either via homogeneous or heterogeneous procedures. In most cases, cellulose esters are produced industrially under heterogeneous conditions. Reaction rates and final degree of substitution (DS) in heterogeneous reactions are hindered by low accessibility of solid cellulose to the esterification reagents (Wei et al., 2007). In order to have homogeneous chemical reaction cellulose need to be first dissolved. In order to achieve uniform chemical reactions or solubilization of cellulosic substrates, it is important to have accessibility high enough. However, due to the high crystallinity, cellulose can be only dissolved in limited solvents at low concentrations. To achieve chemical reactions efficient enough, the native cellulose need to be first activated by disrupting inter- and intramolecular hydrogen bonding making structure accessible to further action of reactants. This can be achieved by varying degrees of chemical, enzymatic or mechanical activation.

The chemical activation can be achieved by different methods like using water, solvents, dilute acids and bases. As a result of chemical activation the cellulose structure becomes less ordered leading to an increase of the active surface area and thus increasing the number of available hydroxyl groups and the accessibility to chemicals. Well known method to disrupt fibrillar aggregation, and increase surface accessibility is to use fluids with a higher swelling power, such as dilute caustic soda (6-10%), dilute quaternary bases or aqueous zinc chloride. Disruption of the crystalline structure, such as with liquid ammonia or 20% caustic soda, which induces cellulose-I to cellulose-II (also regenerated cellulose) crystal modification. Treatments by acid hydrolysis and oxidation, thermal and mechanical treatments by grinding, ultrasonic treatment and freeze-drying and enzymatic treatment are also activation methods but they can degrade the molecules to a certain extent.

The enzymatic activation of cellulose can be done by using different cellulases which hydrolyse the 1,4-$\beta$-D-glucosidic bonds of the cellulose chain. There are three major groups of cellulases: endoglucanases, cellobiohydrolases or exoglucanases, and glucosidases. These enzymes can act alone on the cellulose chain or together degrading efficiently cellulose structure generating mainly glucose or cellobiose units.

The mechanical activation of the cellulose fibres is well known method in the pulp and paper industry. Depending on how and in which conditions the mechanical processing has done it can enhance fiber-fiber bonding, to cut or make the fibres stronger and to change cellulose structure.

Crepy et al. (2009) describe a method for synthetizing plastic materials by the internal plasticization of cellulose with fatty acids. Modifications were done in homogenous solvent under microwave irradiation, which is not currently industrially feasible. The method does not cover both homogeneous and heterogeneous reactions for molar mass controlled hydrolyzed cellulose.

For the application point of view cellulose solubility and mechanical properties need to be tailor without affecting its natural performance too much. For instance, to avoid tedious recycling processes of solvents and huge excess of chemicals in chemical activation cellulose reactivity need to be increase without losing its good mechanical properties to obtain high quality cellulose based materials which are suitable for various applications. One way to increase reactivity of the cellulose is to decrease its molar mass in controlled manner.

WO 2016/193542 discloses a method of improving the reactivity of cellulose in order to utilize cheap and easily available raw material and obtain excellent performance for biomaterial manufacturing, which makes it a suitable starting point for the present invention. The publication does not however disclose use of a molar mass controlled thermoplastic material in injection moulding, film extrusion and three dimensional (3D)-printing for obtaining recyclable and biodegradable objects.

SUMMARY OF THE INVENTION

The invention is defined by the features of the independent claims. Some specific embodiments are defined in the dependent claims.

According to a first aspect of the present invention, there is provided a use of a cheap and available raw material for biomaterial manufacturing.

According to a second aspect of the present invention, there is provided a use of hydrolyzed and reactive molar mass controlled cellulose, having for example excellent thermoplastic properties.

These and other aspects, together with the advantages thereof over known solutions are achieved by the present invention, as hereinafter described and claimed.

The use of the molar mass controlled cellulose is mainly characterized by what is stated in the characterizing part of claim 1.

Considerable advantages are obtained by means of the invention. For example, the modification of hydrolyzed cellulose as herein described provides easily processable thermoplastic materials without using any external plasticizers. Additionally, this material is cheap and easily available, provides excellent performance and is processable by using existing process machines. Furthermore, the material and products obtained thereof are biodegradable and recyclable as being fully bio-based.

Next, the present technology will be described more closely with reference to certain embodiments.

EMBODIMENTS

The present technology provides means to convert inactive cellulose to more reactive form and to an easier functionalization in order to produce thermoprocessable cellulose products by means of for example injection moulding, film extrusion and three dimensional printing.

"Long-chain fatty acid modification" herein means chain length of fatty acid substituents ≥C6, such as C6-C30 and more preferably C6-C18. Such modification may for example be esterification or etherification.

Figure 1:
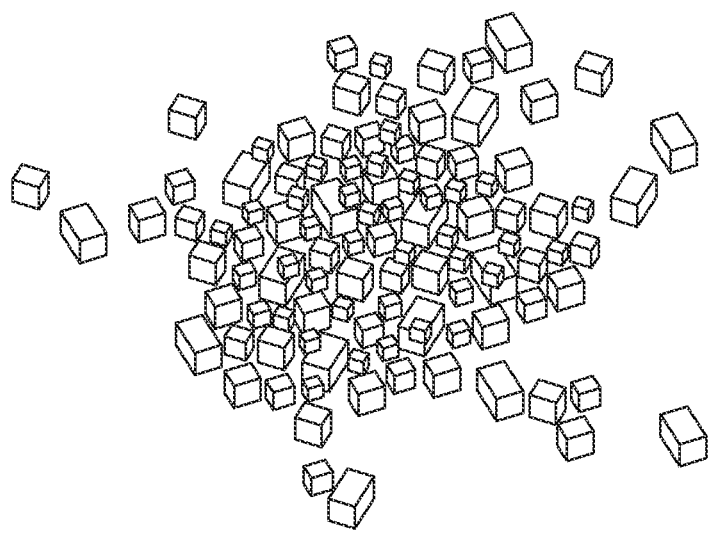
FIG. 1 is a photo describing the molar mass controlled cellulose material of the present invention in form of granules.
Figure 2:
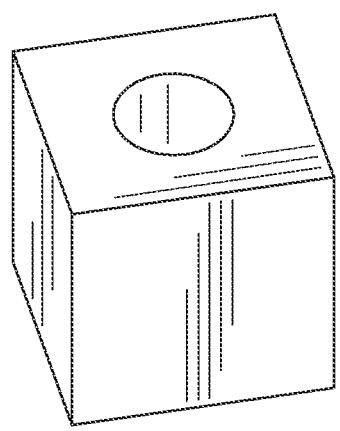
FIG. 2 is a photo describing the molar mass controlled cellulose material of the present invention processed by three dimensional printing.
Figure 3:
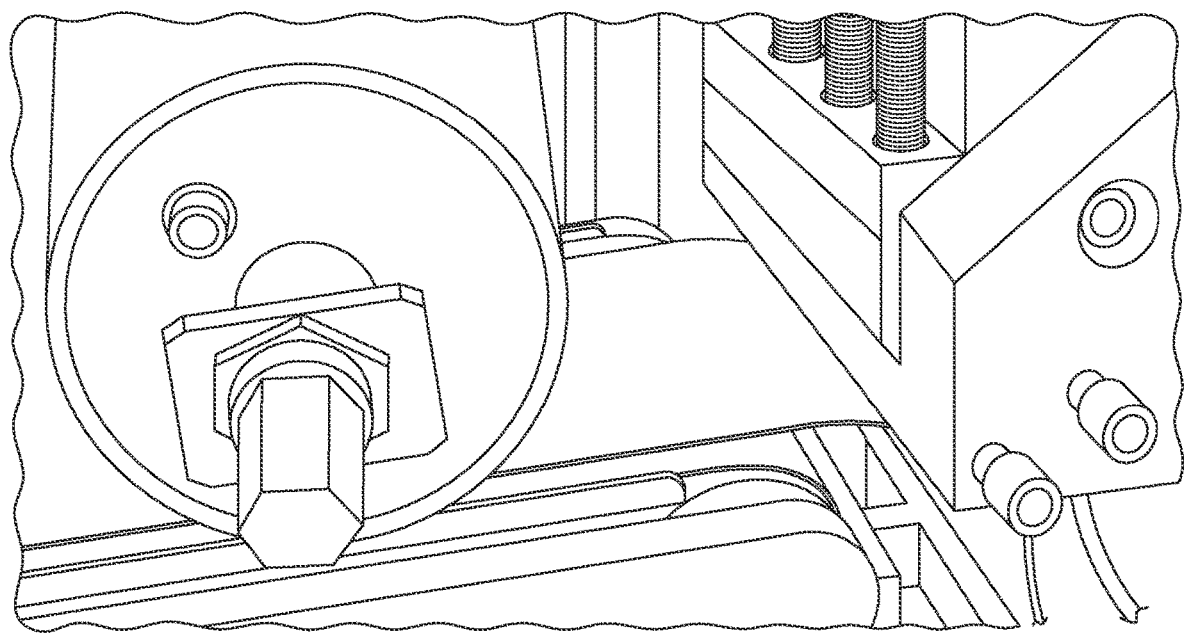
FIG. 3 is a photo describing the molar mass controlled cellulose material of the present invention processed by film extrusion.
Figure 4:
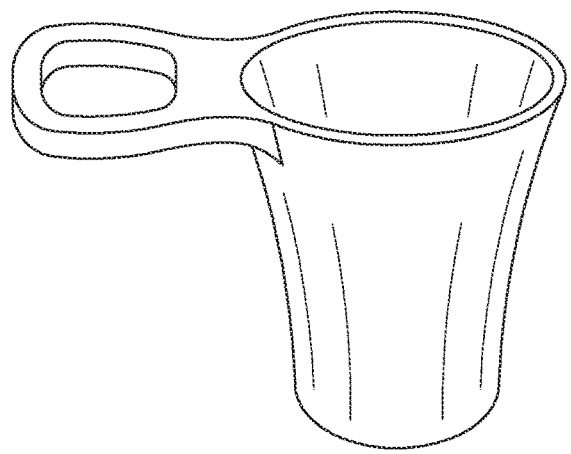
FIG. 4 is a photo describing the molar mass controlled cellulose material of the present invention processed by injection moulding.

One aspect of the present invention is a method of improving the reactivity of cellulose and preparing a transportable form of the previous for preparation of thermoplastic, dispersion able or dissolving derivatives, wherein molar mass and molar mass distribution of the cellulose is controlled uniformly to a range between 30 and 300 kDa therefore providing reactive and processable cellulose.

The method of improving the reactivity of cellulose comprises controlling (i.e. decreasing) the molar mass of a cellulose raw material via hydrolysis, excluding total hydrolysis, and by performing a long-chain (chain length between C6 and C30, such as C6-C18) fatty acid modification for the molar mass controlled cellulose.

The method comprises controlling (i.e. decreasing) the molar mass of a cellulose raw material via hydrolysis, excluding total hydrolysis, and by performing a hydroxyalkylation modification, e.g. hydroxypropylation, hydroxyethylation or hydroxybutylation for the molar mass controlled cellulose.

The hydrolysis is controlled so that the average molecular mass of the cellulose is reduced at least 40% but not more than 85% from the molecular mass of the starting raw material. It is preferred that the hydrolysis is controlled so that after the hydrolysis the average molecular mass of the cellulose is between 30 to 300 kDa, preferably between 40 to 200 kDa. It should be noted that the molar mass of the cellulose is indeed controlled, whereby the cellulose is not subjected to total hydrolysis.

As an example, the inventors prepared cellulose palmitates by heterogeneous esterification in pyridine and homogeneous esterification in the solvent of DMAc/LiCl. To see difference in reactivity, esterification was tested for both native softwood sulfite pulp and molar mass controlled cellulose. In addition, not only to focus cellulose reactivity, the inventors also tested these derivatives as potential thermoplastic materials as well in applications where good and stable water vapor barrier properties are needed. It is described herein how the cellulose raw material molar mass has significant effect to cellulose reactivity. Using hydrolyzed cellulose as a starting material, better reaction efficiency was obtained without losing the good properties of the cellulose esters.

As another example, commercial softwood sulphite dissolving grade pulp was treated with ozone to decrease the degree of polymerization. After the ozone treatment the pulp was subjected to hydrogen peroxide treatment aiming to further decrease the degree of polymerization and to reduce the content of carbonyl groups of the pulp.

The cellulose raw material is selected from native softwood pulp, native hardwood pulp, annual plant pulps such as bamboo pulp or straw pulp, softwood sulphite dissolving grade pulp, hardwood sulphite dissolving grade pulp, ozone treated hydrolyzed pulp or enzyme treated pulp.

Thus, the cellulose material is hydrolyzed and activated by enzymatic treatment, ozone treatment, hydrogen peroxide treatment, alkaline treatment, or other chemical treatment, before performing a long chain fatty acid modification, such as an esterification or hydroxyalkylation.

The long-chain fatty acid modification comprises either heterogeneous esterification or homogeneous esterification of the cellulose.

In case of homogenous esterification, the cellulose raw material is first dissolved into LiCl/DMAc solution.

The long chain fatty acid modification comprises heterogeneous etherification of the molar mass controlled cellulose, for example by hydroxyalkylation. The hydroxyalkylation reaction of the activated cellulose was herein subjected in alkaline conditions either with or without inert solvent such as toluene.

The target substitution level can be adjusted based on reaction conditions such as the amount of reagents and reaction time. The purity of washed esters was confirmed by FT-IR and NMR analysis to verify that all unreacted propylene oxide had been removed.

The target degree of substitution for the cellulose esters was found to be (DS >0.7) for both heterogeneous esterification and homogeneous esterification in the solvent of DMAc/LiCl. DMAc/LiCl-system can be used to dissolve cellulose without any degradation of cellulose. The purity of washed esters was confirmed by FT-IR and NMR analysis to verify that all unreacted fatty acid had been removed.

Thus, a cellulose ester and a cellulose ether obtained by the method as herein described has chain length between C2 and C30, such as C6-C18, and has a total degree of substitution (DS) from 0.7 to 3.

According to DS values of synthesized cellulose palmitate, it can be concluded that the molar mass of starting material has a significant effect to the end product degree of substitution. Both in homogeneous and heterogeneous method, DS values increased when molar masses decreased when similar reaction conditions were used. When pulps were used in homogeneous system, degrees of substitution were >0.7 and the formed cellulose esters were fully soluble to chloroform. In that case films could be prepared for example by simple solvent-casting and/or extrusion and these films have high flexibility and optical transparency. Cellulose esters, which were synthesized in heterogeneous system using hydrolysed cellulose pulp showed also high DS and transparent films could be obtained. However, in that case, the cellulose esters were not fully soluble to chloroform due the uneven distribution of such as palmitate functionalization and therefore some insoluble cellulose fibrils were observed.

A method of producing thermoformable cellulose ester or ether films is characterized by preparing the films from the purified cellulose esters or ethers without using any external plasticizers. However, plasticizers may be used for optimization causes.

One embodiment of the present invention is a use of bio-based and biodegradable thermoplastic material, wherein the material is molar mass controlled cellulose ranging between 30 and 300 kDa, in injection moulding, film extrusion and three-dimensional printing without any external plasticizer.

Another embodiment of the present invention is that the molar mass controlled cellulose material is manufactured into form of granules and processed as such. Known bio-based thermoplastic materials cannot be formulated into granules, but instead are produced as flakes. This feature of granule form makes the transportation and adaptation of the raw material into the process cheaper and easier. Herein, a granule or a granulate or similar is a free-flowing particle having a diameter of 0.5 to 4 mm.

According to one embodiment of the present invention, temperatures such as below 160° C., preferably between 110 and 150° C., can be used in injection moulding and film extrusion applications. These temperatures are essentially lower than in conventional processes, because of lower thermo-mechanical stress. Also, these temperatures are readily applicable to existing process machines. Furthermore, lower temperatures in the plasticizing stage prevent darkening of the material, which is a conventional problem in the art.

Further embodiment of the present invention is that that molar mass controlled cellulose material is reprocessable at least two times, preferably at least three times. This means that the fatty acid working as the inner plasticizer in the polymer chain does not break off when melting the material, because the process temperatures are low and the process does not require high mechanical force.

According to one embodiment of the present invention the used molar mass controlled cellulose materials and the materials and/or objects produced thereof are compostable and/or recyclable.

According to a further embodiment of the present invention, the material used is molar mass controlled cellulose palmitate.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in thermoplastic biomaterial manufacturing by moulding, extrusion and three dimensional printing. Furthermore, the present invention may be used in injection moulding, film extrusion, composite manufacturing and heat-sealable packaging applications. These thermoplastic materials are fully bio-based, biodegradable, compostable and recyclable, and can be processed several times without high thermos-mechanic stress, i.e. high process temperature and high mechanical treatment forces.

Example 1—Synthesis of Molar Mass Controlled Cellulose

Ozone Treatment

Z-stage was performed in a plastic flow through-reactor in medium consistency. Pulp was added into the reactor, and water was charged and the pulp was mixed when the water addition was done. Initial pH was adjusted with $H_2SO_4$ and oxygen flow through the reactor was started.

After 10 minutes ozone generator was started (160 A). Ozone generation (about 192 mg/min) in the carrier oxygen gas was first stabilized for 5 minutes. After stabilization ozone flow was lead to the potassium iodide solution (10 min), and after that gas flow was lead into the reactor. Pulp was mixed all the time during the ozone charging. Mixing was started already one minute before the charging and continued for one minute after the charging was finished. Ozone flow was lead again into potassium iodide solution (10 min), and pulp was rinsed with oxygen flow 10 minutes after the reaction time. Ozone formation was determined from potassium iodide solution by titration with $Na_2S_2O_3$.

Hydrogen Peroxide Treatment

P-stage was performed in Teflon coated medium consistency reactor. Preheated pulp was added into the reactor, and after that, reagents were charged, suspension was mixed and initial pH was measured. Mixing speed was 210 r/min. After reaction time pH was measured from the pulp in the reaction temperature, and residual hydrogen peroxide content of the filtrate was determined.

Pulp Washing

Washing between stages was a standard laboratory washing: Pulp was diluted to 5% consistency with deionized water, which temperature was the same as that of the preceding bleaching stage. After dewatering, the pulp was washed two times with cold deionized water with amount equivalent to ten times the absolutely dry pulp amount.

The intrinsic viscosity of the pulp was determined by a standard ISO 5351-1. The viscosity test is a means for determining the extent of cellulose degradation produced by cooking and bleaching. The limiting viscosity number of cellulose is determined in dilute cupri-ethylene-diamine (CED) solution. First the pulp sample is continuously shaken in flask containing deionized water and copper pieces until the sample has been completely disintegrated. Then the CED solution is added and shaking is continued until the sample has been dissolved. After this the efflux time of the sample is determined with viscometer. The measurement programme of the viscometer gives automatically the intrinsic viscosity value of the sample.

Dissolving Cellulose to DMAc/LiCl System

Cellulose was dissolved by a method described by Sjöholm et al 2000. Cellulose (2-5 wt-%) was added via solvent-exchange (water/methanol/DMAc sequence) to 5% LiCl/DMAc solution. The mixture was heated to 80° C. for 2 hours and allowed to slowly cool to room temperature. A uniformly transparent cellulose solution was observed.

Preparation of Cellulose Palmitate Using Homogenous Method

The homogenous esterifications of the cellulose were conducted by using a method, in which cellulose was first dissolved via solvent-exchange to DMAc/5% LiCl solution. Then anhydrous pyridine (3.6 equivalents to cellulose AGU) was mixed with cellulose solution. Finally palmitoyl chloride (3.0 equivalents to cellulose AGU) was added slowly to the cellulose mixture. The mixture was then warmed to 60° C. and mixing was continued for 16 h at a constant temperature. The product was then precipitated with ethanol, filtered and additionally washed with ethanol and acetone.

Preparation of Cellulose Palmitate Using Heterogenous Method

Cellulose and anhydrous pyridine (20 equivalents to cellulose AGU) were mixed together and palmitoyl chloride (3 equivalents to cellulose AGU) was added slowly to the cellulose mixture. The mixture was stirred either overnight at 60° C. or 5 h at 100° C. temperature. The product was then precipitated using ethanol, filtered and additional washed with ethanol and with acetone.

Example 2—Properties of the Molar Mass Controlled Cellulose

Mechanical properties were tested according to table 1, which also shows corresponding values for typical reference materials.

TABLE 1

| Tests | MMCC pilot 1 | MMCC pilot 1 + 10% fiber | Ref. PLA | Ref. HOPE | Ref. LDPE | Ref. CA |
|---|---|---|---|---|---|---|
| Tensile strength (MPa) | 11 | 9 | 50-55 | 20-40 | 8-12 | 30-40 |
| Young's modulus (MPa) | 232 | 328 | 3500 | 200-1000 | 200-400 | 1600 |
| Elongation at break (%) | 12 | 8 | 5-100 | >100 | >100 | 2-5 |
| Impact Strength (kJ/m$^2$) | 6.8 | 7 | 3-7 | 2-12 | No break | |
| HDT 1.80 MPa (° C.) | 33 | 33 | 40-45 | 60 | 35-37 | 48-60 |
| MFI (g/10 min) | 3.2 | | 2-5 | 4-8 | 1-4 | |
| Density (g/cm$^3$) | ~1 | ~1 | ~1.2 | ~1 | ~0.9 | ~1.3 |
| Melting temperature (° C.) | 130-150 | | 120-170 | 120-190 | 120-160 | 210 |

Thermal properties of samples were analyzed by differential scanning calorimetry (DSC) (table 2). Because the long chain cellulose esters are amorphous, primary cellulose melting cannot be observed. In case of cellulose palmitate, the detected melting is due to melting of the side-chains. The side-chain melting can take place when cellulose ester substituent length is C10 or longer. Thus, no side-chain melting can be detected for cellulose octanate. In case of C8/C16 blends, the melting temperature ($T_m$) of C16 side-chain is almost constant (27° C.), but the melting enthalpy decreases when the amount of cellulose octanate is increased.

Either cellulose palmitate or cellulose octanate have no clear glass transition temperature ($T_g$). Glass transition of PLA is 62° C. and it can be detected, when samples contain 50 w % or more of PLA. No significant change of PLA $T_g$ was observed in the blends, but the enthalpy of $T_g$ decreased when ratio of PLA in samples decreased. Multiple endothermic peaks corresponding to the melting of the PLA crystallites ($T_m$) can be identified at around 150° C. for all PLA blends.

When cellulose palmitate is compounded with PLA, both the melting of PLA and the melting of cellulose palmitate side-chains can be detected, and the melting enthalpies correlate well with the ratios in blends. The same behavior was observed in the case of C16/bio-PE blends. Glass transition temperature of PE is lower than the minimum temperature (−40° C.) of the DSC analysis, so it cannot be observed due to the temperature range limitations of test equipment.

TABLE 2

Thermal properties of compounded samples

| Entry | Material | $T_m$ (°C.)[a] | Melting enthalpy (J/g)[b] | $T_g$ (°C.)[a] | $\Delta Cp$ (J g$^{-1}$ K$^{-1}$)[b] |
|---|---|---|---|---|---|
| 1 | C16 100% | 27[c] | 30[c] | n.d | n.d |
| 2 | C8 100% | n.d | n.d | n.d | n.d |
| 3 | PLA 100% | 151 | 27 | 62 | 0.25 |
| 4 | PE 100% | 132 | 176 | n.d | n.d |
| 5 | C16 75%:C8 25% | 23[c] | 19[c] | n.d | n.d |
| 6 | C16 50%:C8 50% | 22[c] | 8[c] | n.d | n.d |
| 7 | C16 25%:C8 75% | 21[c] | 5[c] | n.d | n.d |
| 8 | C16 75%:PLA 25% | 26[c]/149 | 17[c]/9 | n.d | n.d |
| 9 | C16 50%:PLA 50% | 25[c]/149 | 11[c]/14 | 60 | 0.07 |
| 10 | C16 25%:PLA 75% | 25[c]/150 | 5[c]/23 | 62 | 0.14 |
| 11 | C8 75%:PLA 25% | 148 | 6 | n.d | n.d |
| 12 | C8 50%:PLA 50% | 150 | 13 | 62 | 0.25 |
| 13 | C8 25%:PLA 75% | 151 | 22 | 62 | 0.22 |
| 14 | C16 75%:PE 25% | 26[c]/131 | 11[c]/36 | n.d | n.d |
| 15 | C16 50%:PE 50% | 25[c]/131 | 6[c]/92 | n.d | n.d |
| 16 | C16 25%:PE 75% | 24[c]/133 | 3[c]/131 | n.d | n.d |
| 17 | C8 75%:PE 25% | 133 | 40 | n.d | n.d |
| 18 | C8 50%:PE 50% | 133 | 85 | n.d | n.d |
| 19 | C8 25%:PE 75% | 133 | 122 | n.d | n.d | n.d = not detected
[a]standard deviation ±2° C. (DIN 53765)
[b]standard deviation ±7.5% (DIN 53765)
[c]side-chain melting temperature of cellulose palmitate Reprocessability test was conducted with RAY-RAN Melt flow indexer (Model 3A) with load of 2.16 kg and melting temperature of 150° C. During first heating the melt flow index was 3.22 g/10 minutes and during second heating the melt flow index was 5.04 g/10 minutes.

The result shows that the material is recyclable (without plasticizers and stabilizers) at least once, which is streamlined with the current industrial practises in the recycling systems in OECD countries.

CITATION LIST

Patent Literature

1. WO 2016/193542 A1

Non-Patent Literature

1. Edgar K., Buchanan C., Debenham J., Rundquist P., Seiler B., Shelton M., Tindall S., *Prog. Polym. Sci.* 2001, 26:1605-1688.
2. Klemm D., Schmauder H.-P., Heinze T., *Cellulose*, Biopolymers, 2002. 6: p. 275-319.
3. Wei Y., Cheng F., Hou G., *J. Sci. Ind. Res.* 2007, 66: 1019-1024.
4. Crepy L., Chaveriat L., Banoub J., Martin P., Joly N., *ChemSusChem*, 2009, 2(2), pp. 165-170.
5. Sjöholm E., Gustafsson K., Eriksson B., Brown W., Colmsjö A. (2000) Aggregation of cellulose in lithium chloride/N,N-dimethylacetamide, Polymers 41:153-161
6. Hamod H., Degree Thesis: Plastics Technology, 2014, Arcada University of Applied Science, Finland.
7. http://www.matweb.com/reference/deflection-temperature.aspx

The invention claimed is:

1. A method for manufacturing thermoplastic cellulose material comprising:
   decreasing a molar mass of a raw cellulose material via hydrolysis, excluding total hydrolysis, to generate a hydrolyzed molar mass controlled cellulose, wherein the hydrolysis provides the hydrolyzed molar mass controlled cellulose with an average molecular mass of 30 to 300 kD and reduces an average molecular mass of the raw cellulose material by 40-85%; and
   performing a long chain fatty acid modification on the hydrolyzed molar mass controlled cellulose to produce the thermoplastic cellulose material.

2. The method of claim 1, wherein the thermoplastic cellulose material comprises a cellulose ester or ether having a chain length between 6 and 30 carbon atoms.

3. The method of claim 2, wherein the cellulose ester or ether has a chain length between 6 and 18 carbon atoms.

4. The method of claim 1, wherein the thermoplastic cellulose material comprises a degree of substitution (DS) of from 0.7 to 30.

5. The method of claim 1, wherein the long chain fatty acid modification comprises a member selected from the group consisting of esterification, etherification, and hydroxyalkylation.

6. The method of claim 1, wherein the long chain fatty acid modification comprises heterogeneous or homogeneous esterification of the hydrolyzed molar mass controlled cellulose.

7. The method of claim 1, wherein the thermoplastic cellulose material is compostable and/or recyclable.

8. The method of claim 1, wherein the thermoplastic cellulose material is reprocessable at least two times.

9. The method of claim 1, wherein the cellulose raw material is selected from the group consisting of native softwood pulp, native hardwood pulp, annual plant pulp, softwood sulphite dissolving grade pulp, hardwood sulphite dissolving grade pulp, ozone treated hydrolyzed pulp, and enzyme treated pulp.

10. The method of claim 1, wherein the average molecular mass is reduced to 40 to 200 kD.

11. The method of claim 1, wherein the thermoplastic cellulose material comprises cellulose palmitate.

12. The method of claim 1, wherein the thermoplastic cellulose material comprises granules having a diameter of 0.5 to 4 mm.

13. The method of claim 1, further comprising activating the hydrolyzed molar mass controlled cellulose prior to performing the long chain fatty acid modification.

14. The method of claim 12, wherein the granules are free from external plasticizers.

* * * * *